(12) United States Patent
Chia-Hung

(10) Patent No.: US 6,448,957 B1
(45) Date of Patent: Sep. 10, 2002

(54) WATERPROOF POINTING DEVICE OF A KEYBOARD

(75) Inventor: Liu Chia-Hung, Taipei Hsien (TW)

(73) Assignee: Darfon Electronics Corp., Taoyuan (TW)

( * ) Notice: Subject to any disclaimer, the term of this patent is extended or adjusted under 35 U.S.C. 154(b) by 0 days.

(21) Appl. No.: 09/497,666

(22) Filed: Feb. 4, 2000

(30) Foreign Application Priority Data

Feb. 12, 1999 (TW) .......................................... 88102323 A

(51) Int. Cl.⁷ .............................................. H03K 17/94
(52) U.S. Cl. ........................ 345/161; 345/156; 345/168; 200/302.1; 200/302.2; 200/302.3
(58) Field of Search ................................ 345/156, 161, 345/168; 200/302.2, 302.3, 302.1

(56) References Cited

U.S. PATENT DOCUMENTS

| | | | | |
|---|---|---|---|---|
| 4,994,669 A | * | 2/1991 | Stern .......................... | 250/221 |
| 5,541,622 A | * | 7/1996 | Engle et al. ................. | 345/161 |
| 5,694,123 A | * | 12/1997 | Selker et al. ................. | 341/20 |
| 6,141,667 A | * | 10/2000 | Duff ............................ | 708/100 |
| 6,219,038 B1 | * | 4/2001 | Cho ............................ | 200/305 |
| 6,239,391 B1 | * | 5/2001 | Nishijima et al. ....... | 200/302.2 |

* cited by examiner

Primary Examiner—Bipin Shalwala
Assistant Examiner—Vincent E. Kovalick
(74) Attorney, Agent, or Firm—Winston Hsu

(57) ABSTRACT

A pointing device of a keyboard which comprises a chassis board for mounting a plurality of keys. The chassis board comprises a hole positioned at its approximate center for mounting the pointing device. The pointing device comprises a pedestal installed below the hole of a chassis board, an elastic pad mounted between the chassis board and the pedestal with a hole positioned below the hole of the chassis board, and a control bar vertically fixed to the pedestal and protruding through the holes of the elastic pad and the, chassis board. The elastic pad is tightly clamped between the pedestal and the chassis board for preventing liquid above the chassis board from leaking into the space below the chassis board and the pedestal through the hole of the chassis board.

17 Claims, 6 Drawing Sheets

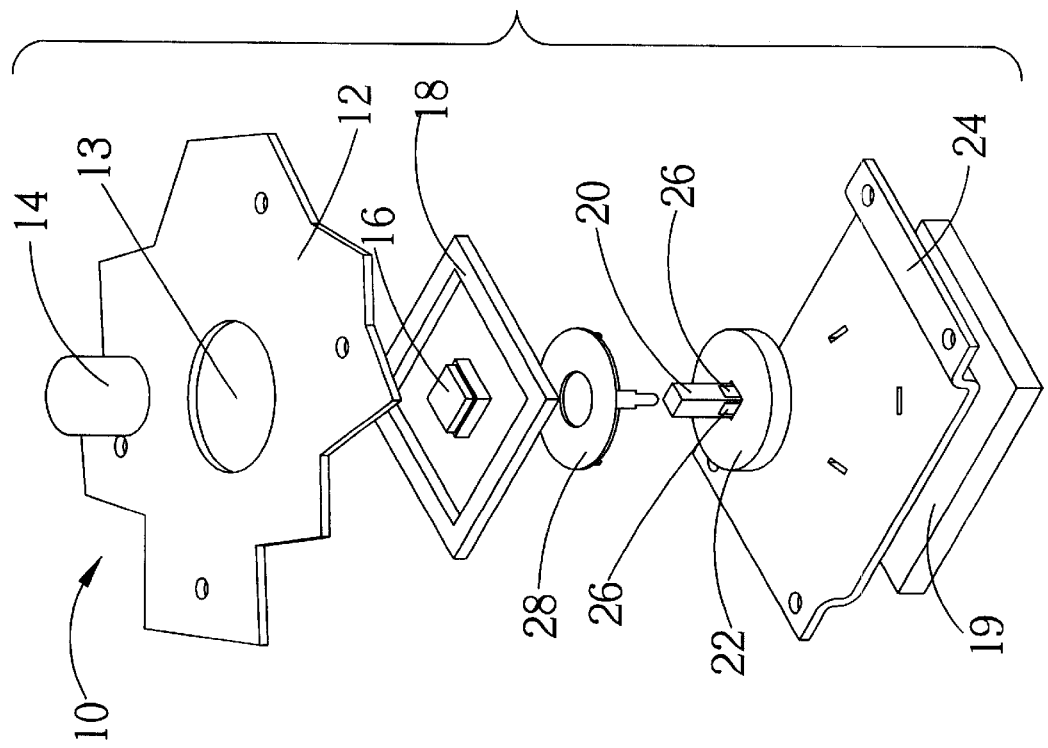
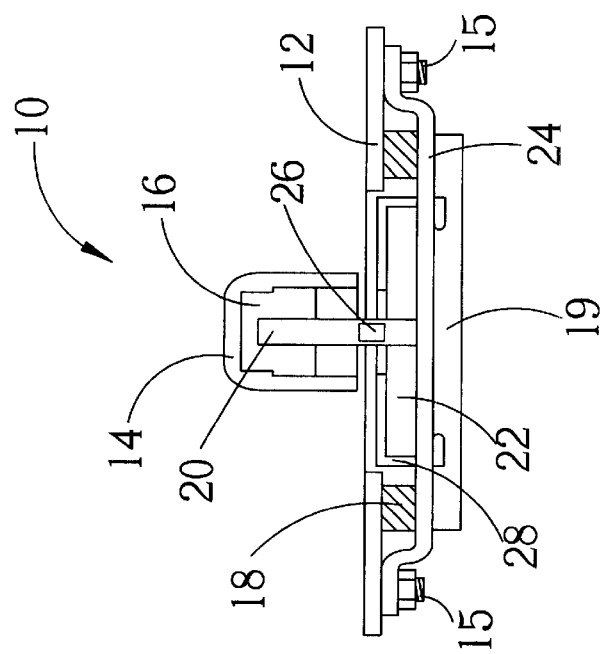

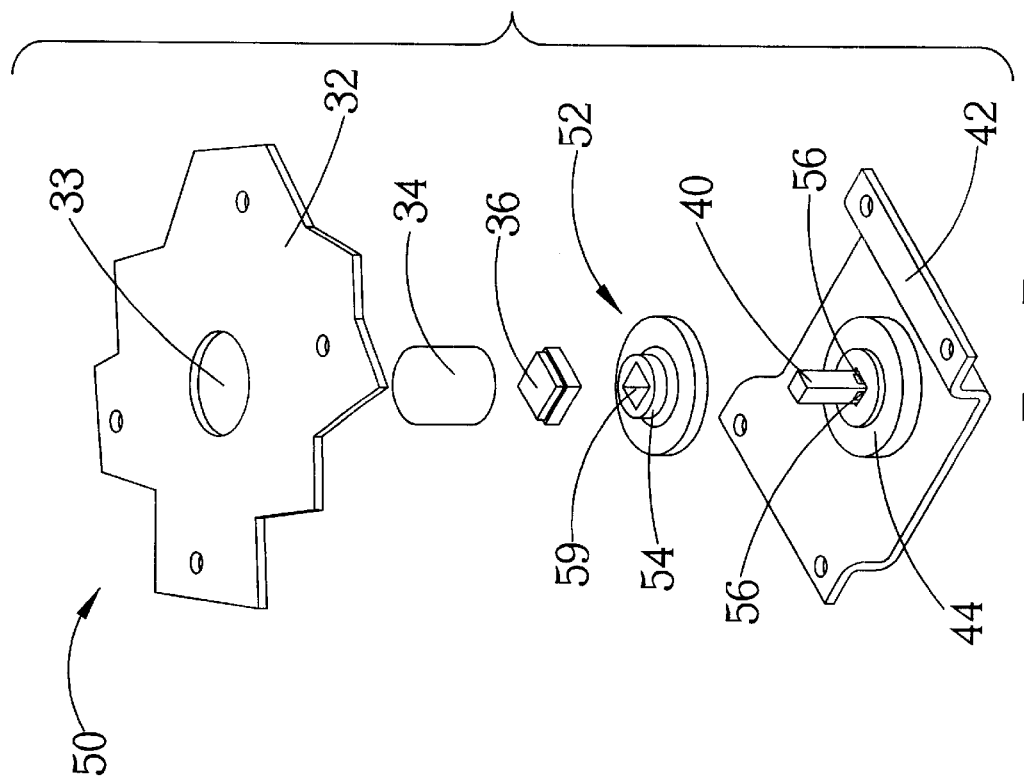
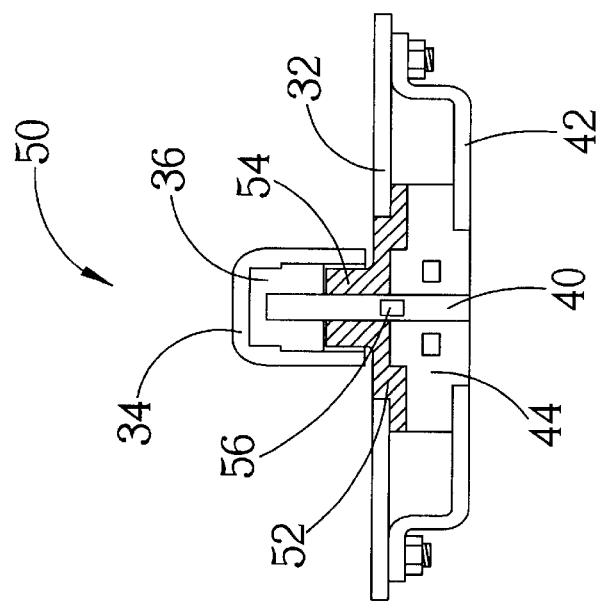

WATERPROOF POINTING DEVICE OF A KEYBOARD

BACKGROUND OF THE INVENTION

1. Field of the Invention

The pre sent invention relates to a pointing stick device, and more particularly, to a waterproof pointing device of a keyboard.

2. Description of the Prior Art

A pointing device is usually installed on the keyboard of a notebook computer and provides a means of inputting cursor control signals. It is often installed on the keyboard chassis board with a hole. There are often gaps between the pointing device and the chassis board; therefore, if not careful, liquids, such as water or coffee may accidentally spill on the keyboard and leak into the interior of the keyboard through these gaps. This will adversely affect the functioning of the pointing device and further damage the mainboard installed below the keyboard of the notebook computer.

The structure of a waterproof pointing device according to the prior art is illustrated in FIG. 1 and FIG. 2. FIG. 1 is a sectional diagram of a pointing device 10 according to prior art. FIG. 2 is an exploded diagram of the pointing device 10 shown in FIG. 1. The pointing device 10 is installed on a chassis board 12 with a hole 13. The pointing device comprises a metallic base plate 24 mounted on the bottom side of the chassis board 12 by screws 15, a plastic pedestal 22 mounted between the chassis board 12 and the base plate 24, a clamping unit 28 for clamping the plastic pedestal 22 on the base plate 24, a square control bar 20 vertically fixed on the plastic pedestal 22 and protruding through the hole 13 of the chassis board 12, a rubber cap 14 installed on the top of the control bar 20, and an adapter 16 installed between the rubber cap 14 and the control bar 20. There is also a rubber-like backing 19 adherent to the back of the base plate 24 and a square shaped rubber-like sponge 18 installed exterior to the plastic pedestal 22 on the base plate 24. The rubber-like sponge 18 is clamped between the chassis board 12 and the base plate 24 to prevent leakage of liquid. The pointing device 10 further comprises four sensors 26 individually installed in four directions near the bottom end of the control bar 20 for sensing the movement of the control bar and generating the corresponding sensing signals.

Because the plastic pedestal 22 is fixed with the clamping unit 28 but does not form a waterproof seal, the rubber-like sponge 18 cannot be placed between the chassis and the clamping unit 28. Instead, rubber-like sponge 18 must be placed at the periphery of the plastic pedestal 22. Therefore, it is imperative that the area of the base plate 24 be large enough to accommodate the rubber-like sponge 18. Because the pointing device 10 is installed on the chassis board of the keyboard and the base plate is protruding outward from the chassis board, space must be allowed under the keyboard for both the mainframe as well as the base plate 24. Space for the mainframe is severely limited thus increasing the difficulty of design and assembly. Also, in the above mentioned waterproof pointing device of the prior art, rubber-like sponge 18 can only be used temporarily to prevent liquid from leaking into the keyboard. This is due in part to the fact that the liquid will accumulate in the interior of the rubber-like sponge 18 thus leading to rusting of the metal base plate 24. Eventually, liquid will inevitably leak onto the mainboard and cause damage. The sensor 26 at the bottom of control bar 20 will also be damaged from this liquid.

SUMMARY OF THE INVENTION

It is therefore a primary objective of the present invention to provide a waterproof pointing device of a keyboard to solve the above mentioned problem.

In a preferred embodiment, the present invention provides a pointing device of a keyboard which comprises a chassis board for mounting a plurality of keys, the chassis board comprising a hole positioned at its center approximate for mounting the pointing device, the pointing device comprising:

a pedestal installed below the chassis board under the hole of the chassis board;

an elastic pad mounted between the chassis board and the pedestal with a hole positioned below the hole of the chassis board; and a control bar vertically fixed to the pedestal and protruding through the holes of the elastic pad and the chassis board;

wherein the elastic pad is tightly clamped between the pedestal and the chassis board for preventing liquid above the chassis board from leaking into the space below the chassis board and the pedestal through the hole of the chassis board.

It is an advantage of the present invention that the elastic pad can be tightly clamped between the chassis board and the plastic pedestal for preventing liquid from leaking through the hole of the chassis board into the base plate. Also, no liquid will accumulate on the base plate or the sensors at the bottom end of the control bar and, therefore, the main board below the keyboard will not be subjected to damage by liquid. There are many designs for the elastic pad of the pointing device of the present invention. The elastic pad is installed on top side of the plastic pedestal and only occupies space within the plastic pedestal on the base plate. The base plate may be reduced in size thus further facilitating the installation of the pointing device within a limited space.

This and other objectives of the present invention will no doubt become obvious to those of ordinary skill in the art after having read the following detailed description of the preferred embodiment which is illustrated in the various figures and drawings.

BRIEF DESCRIPTION OF THE DRAWINGS

FIG. 1 is a sectional diagram of a pointing device according to prior art.

FIG. 2 is an exploded diagram of the pointing device shown in FIG. 1.

FIG. 6 is a sectional diagram of the pointing device of the second embodiment according to the present invention.

FIG. 7 is an exploded diagram of the pointing device shown in FIG. 6.

DETAILED DESCRIPTION OF THE PREFERRED EMBODIMENT

Figure 3:
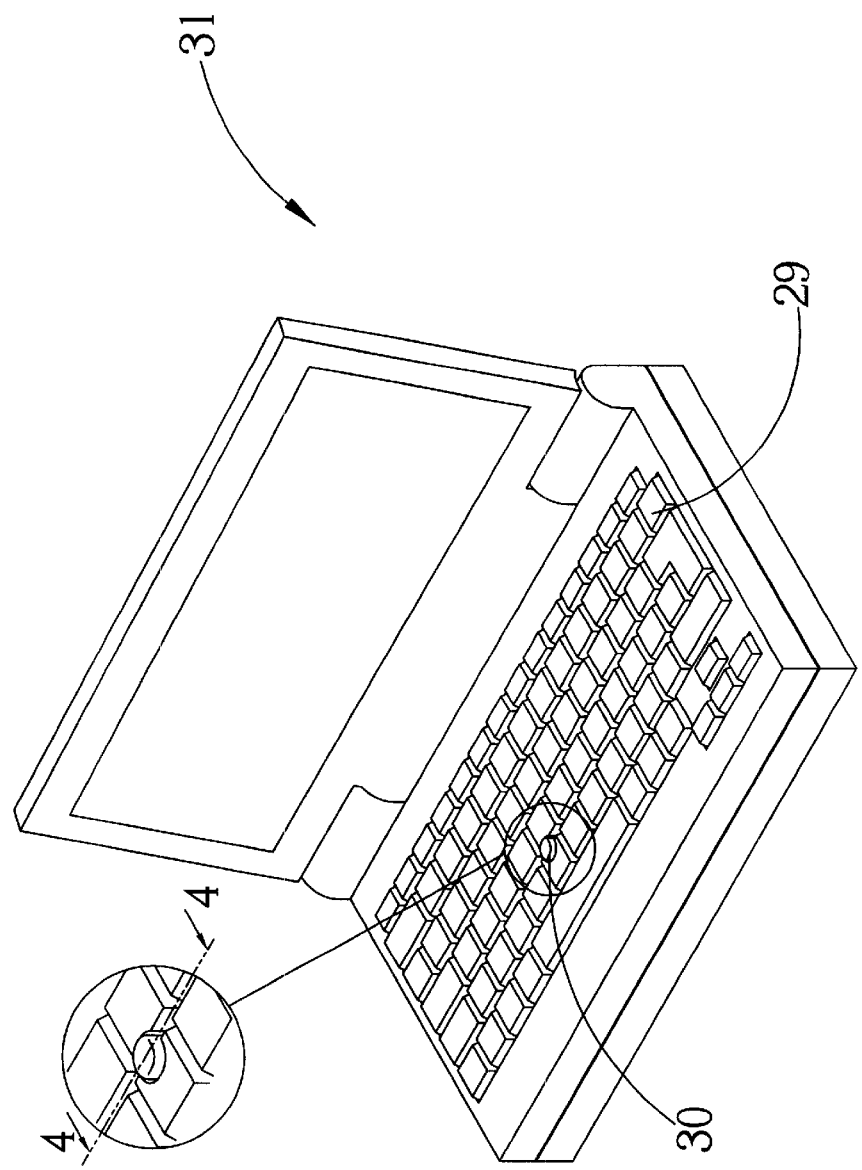
FIG. 3 is a perspective diagram of a pointing device of a keyboard according to the present invention.
Figure 5:
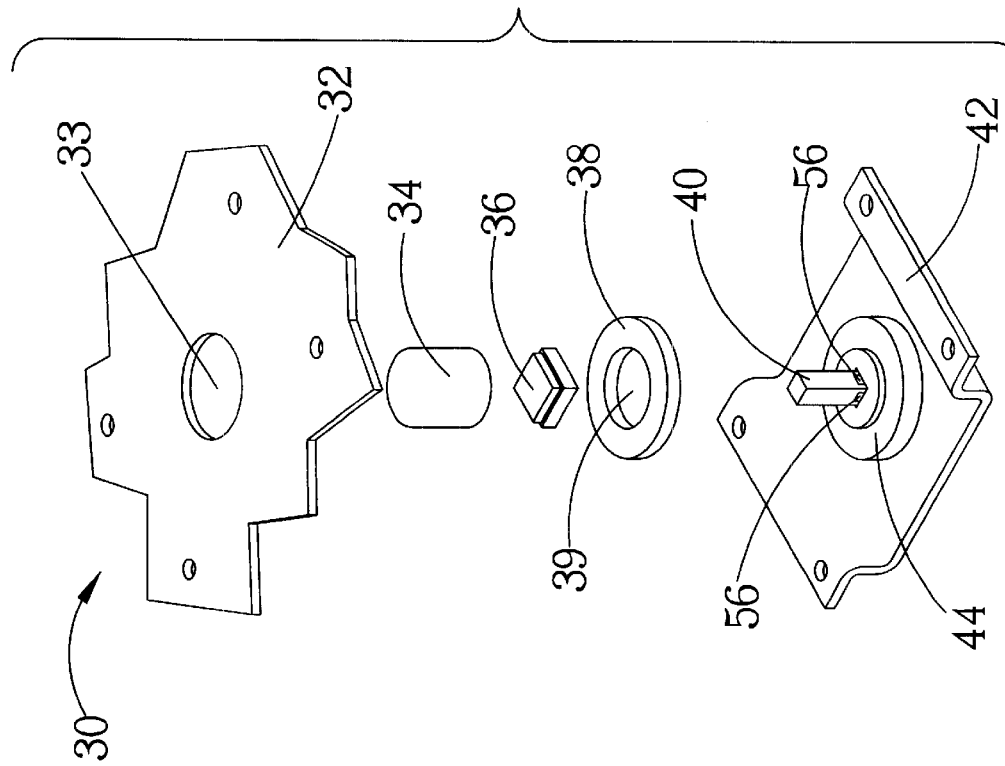
FIG. 5 is an exploded diagram of the pointing device shown in FIG. 4.
Figure 4:
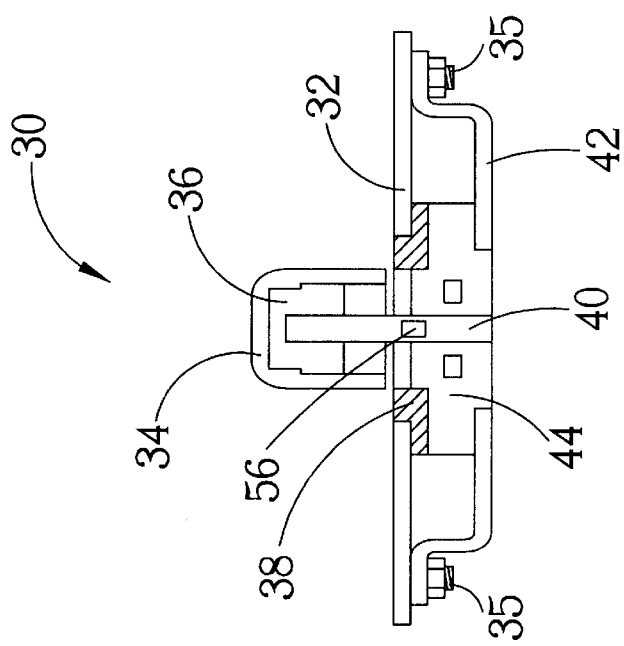
FIG. 4 is a sectional diagram along line 4—4 of the pointing device of the first embodiment shown in FIG. 3 according to the present invention.

Please refer to FIG. 3 to FIG. 5. FIG. 3 is a perspective diagram of a pointing device 30 installed in a notebook computer 31 according to the present invention. FIG. 4 is a sectional diagram along line 4—4 of the pointing device 30 of the first embodiment shown in FIG. 3 according to the present invention. FIG. 5 is an exploded diagram of the pointing device 30 shown in FIG. 4. A notebook computer 31 comprises a keyboard, and the keyboard comprises a chassis board 32 for mounting a plurality of keys 29, and the chassis board 32 comprises a hole 33 positioned at its approximate center for mounting a pointing device 30. The pointing device 30 comprises a base plate 42 and a plastic pedestal 44 wherein the base plate 42 and the plastic pedestal 44 are coupled by using insert molding. The base plate 42 is fixed to the lower of the chassis board 32 with screws 35. An elastic pad 38 is mounted between the chassis board 32 and the plastic pedestal with a hole 39 positioned below the hole 33 of the chassis board 32. The pointing device 30 further comprises a square control bar 40 vertically fixed to plastic pedestal 44 of the base plate 42 protruding through the holes 39 of the elastic pad 38 and the chassis board 32. A rubber cap 34 is mounted at the top end of the control bar 40, and an adapter 36 is mounted between the rubber cap 34 and the control bar 40. Four sensors 56 are installed at a lower end of the control bar 40 and positioned for sensing movements of the control bar 40 in various directions and generating corresponding sensing signals.

The elastic pad 38 is a rubber ring that is tightly clamped between the chassis board 32 and the plastic pedestal 44 of the base plate 42 for preventing liquid above the chassis board 32 from leaking into the space below the chassis board 32 and the base plate 42 through the hole 33 of the chassis board 32. Because the elastic pad 38 is positioned on the plastic pedestal 44 and does not occupy much space, required space for the base plate 42 of the present invention is reduced.

Please refer to FIG. 6 and FIG. 7. FIG. 6 is a sectional diagram of the pointing device 50 of the second embodiment according to the present invention. FIG. 7 is an exploded diagram of the pointing device 50 shown in FIG. 6. The difference between the pointing device 50 and the pointing device 30 is the design of the elastic pad. The elastic pad 52 of the pointing device 50 comprises an upward protruding portion 54 for wrapping the sensors 56. The shape of the upward protruding portion 54 can be similar to the hole 33 of the chassis board 32. When the elastic pad 52 is clamped between the chassis board 32 and the plastic pedestal 44, the upward protruding portion 54 of the elastic pad 52 is clamped in the hole 33 of the chassis board 32 for preventing liquid from leaking through the gap between the hole 33 of the chassis board 32 and the upward protruding portion 54 of the elastic ad 52 into the base plate 42. When the control bar protrudes through the chassis board 32 through the hole 59 of the elastic pad 52 and the hole 33 of the chassis board 32, the upward protruding portion 54 will be tightly wrapped around the bottom of the control bar 40 to prevent liquid from contacting the sensors 56.

Figure 9:
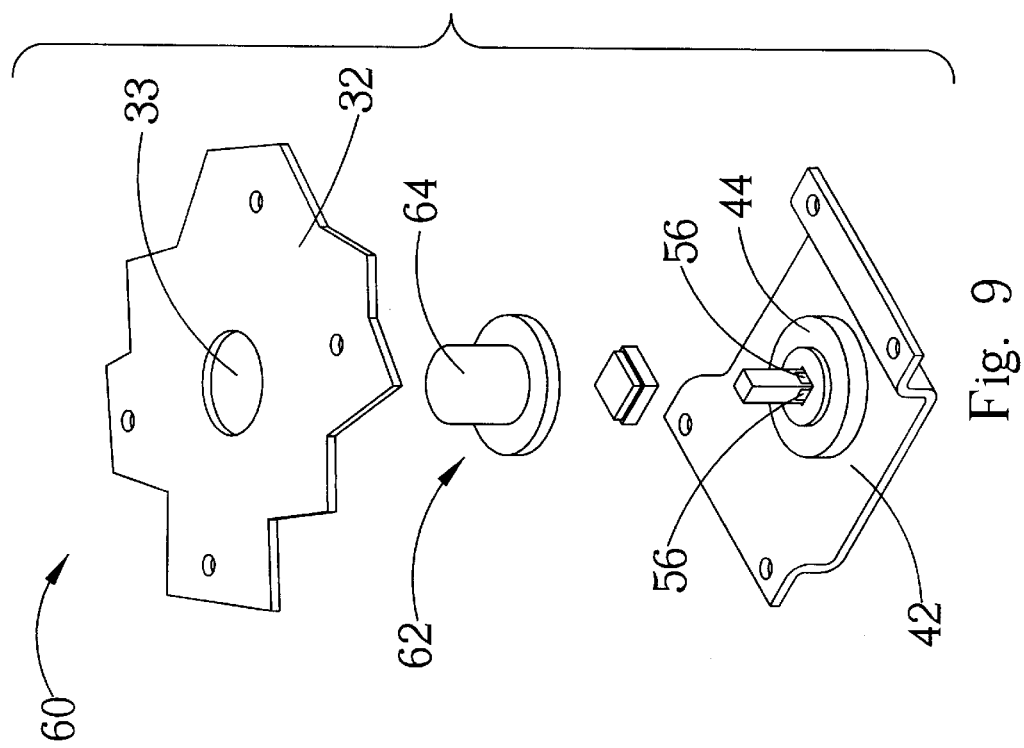
FIG. 9 is an exploded diagram of the pointing device shown in FIG. 8.
Figure 8:
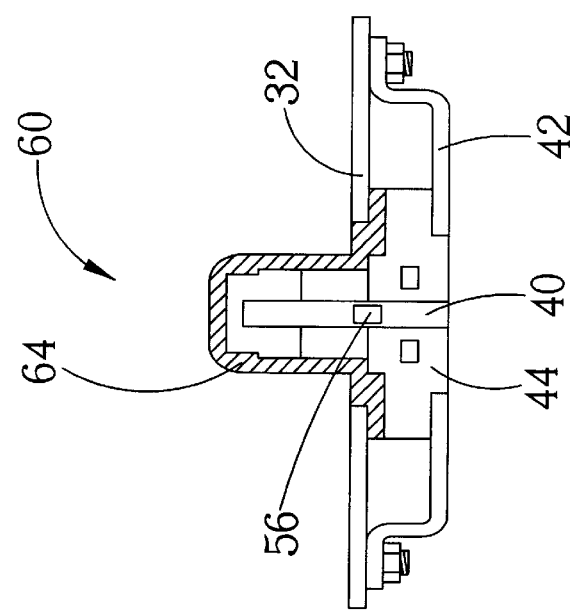
FIG. 8 is a sectional diagram of the pointing device of the third embodiment according to the present invention.

Please refer to FIG. 8 and FIG. 9. FIG. 8 is a sectional diagram of the pointing device 60 of the third embodiment according to the present invention. FIG. 9 is an exploded diagram of the pointing device 60 shown in FIG. 8. Pointing device 60 differs from pointing device 30, 50 in that the rubber cap 64 and the elastic pad 62 are fabricated as a single unit. When the elastic pad 62 is clamped between the chassis board 32 and the plastic pedestal 44, the rubber cap 64 of the elastic pad 62 protrudes through the hole 33 of the chassis board 32 and the elastic pad 62 is clamped in the hole 33 of the chassis board 32 for preventing liquid from leaking through the hole 33 of the chassis board 32 into the base plate 42.

The elastic pad 62 is tightly clamped between the chassis board 32 and the plastic pedestal 44, thus preventing liquids from leaking into the base plate 42. Also, extraneous external forces on the keyboard may be inadvertently transmitted to the sensors 56 of the control bar 40 and generate wrong signals. This may be prevented if the bottom side of the periphery of the rubber cap is made into a thin and puckered spiral (not shown) to absorb the force transmitted from the keyboard.

Figure 10:
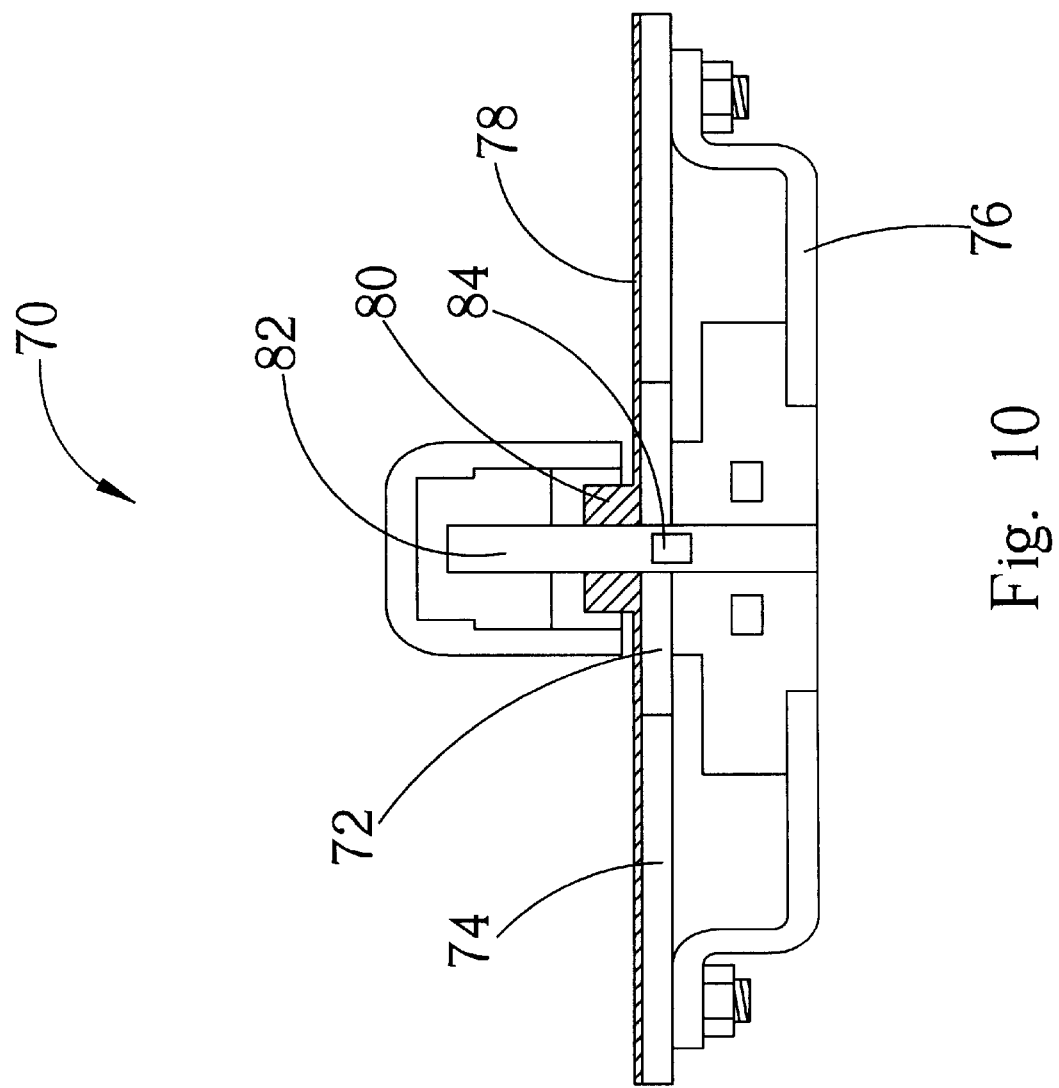
FIG. 10 is a sectional diagram of the pointing device of the fourth embodiment according to the present invention.

Please refer to FIG. 10. FIG. 10 is a sectional diagram of the pointing device 70 of the fourth embodiment according to the present invention. A pointing device 70 is installed on a chassis board 74 with a hole 72. The pointing device 70 comprises a base plate 76 fixed to the bottom side of the chassis board 74, a rubber pad 78 mounted on the chassis board 74 comprising a circular structure 80 and a hole, and a control bar 82 vertically fixed to the base plate 76 protruding through the hole 72 of the chassis board 74 and the hole of the circular structure 80. The circular structure 80 is an upward protruding rubber ring and is tightly wrapped around the control bar 82 to prevent liquid above the chassis board 74 from leaking through the gap between the hole of the circular structure 80 and the control bar 82 and contacting the sensors 84.

Compared to the pointing device 10 of the prior art, the elastic pad 52, 62 of the pointing device 50, 60 in the present invention are tightly clamped between the chassis board 32 and the plastic pedestal 44. The rubber pad 78 of the pointing device 70 is tightly wrapped around the. control bar 82. All of the elastic pad 52, 62 and the rubber pad 78 are specially designed with upward protruding portion 54, 64, 80. Therefore, it can prevent liquid above the chassis board 32, 74 from leaking through the hole to contact and damage the sensors 56, 84. In fact, such design of the elastic pad 52, 62 and rubber pad 78 can well be utilized in the prior art shown in FIG. 1 as an improvement. As to the elastic pad 38 shown in FIG. 5, because no upward protruding portion is accommodated in the elastic pad 38, the base plate 42 and the plastic pedestal 44 below must be coupled by using insert molding so as to prevent liquid leaking through the hole of the chassis board 32 down into the plastic pedestal 44 and the base plate 42.

As liquid will not accumulate on the base plate, the sensors at the bottom end of the control bar and the main board below the keyboard will not sustain damage by liquid. The elastic pad of the pointing device of the present invention can have various designs. The elastic pad is installed on the upper side of the plastic pedestal and does not occupy space outside the areas occupied by the plastic pedestal on the base plate. Therefore, the size of the base plate can be reduced and installation of the pointing device in a limited space can be facilitated.

Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A pointing device of a keyboard which comprises a chassis board for mounting a plurality of keys, the chassis board comprising a hole for mounting the pointing device, the pointing device comprising:

a pedestal installed below the chassis board under the hole of the chassis board;

an elastic pad mounted between the chassis board and the pedestal with a hole positioned below the hole of the chassis board; and a control bar vertically fixed to the pedestal and protruding through the holes of the elastic pad and the chassis board;

wherein the elastic pad is tightly clamped so as to be flush against all surfaces between the pedestal and the chassis board for preventing liquid above the chassis board from leaking into the space below the chassis board and the pedestal through the hole of the chassis board.

2. The pointing device of claim 1 wherein the elastic pad is a rubber ring.

3. The pointing device of claim 1 wherein the elastic pad comprises an upward protruding portion and the hole of the elastic pad is positioned at a center of the upward protruding portion wherein the upward protruding portion is tightly wrapped around the control bar for prevent liquid above the chassis board from leaking through the hole of the elastic pad.

4. The pointing device of claim 3 further comprising a sensor installed at a lower end of the control bar and positioned within the upward protruding portion of the elastic pad for sensing movements of the control bar in various directions and generating corresponding sensing signals.

5. The pointing device of claim 1 wherein a base plate is further provided for supporting the pedestal, and the pedestal is positioned under the chassis board by the base plate.

6. The pointing device of claim 5 wherein the base plate and the pedestal are coupled by using insert molding.

7. The pointing device of claim 5 wherein the base plate is fixed to the chassis board by using screws.

8. The pointing device of claim 1 wherein the elastic pad further comprises an upward protruding cap above the hole of the elastic pad for covering an upper end of the control bar to prevent liquid above the chassis board from leaking into the hole of the elastic pad.

9. The pointing device of claim 1 wherein the elastic pad further comprises an upward protruding portion for tightly engaging the hole of the chassis board to prevent liquid above the chassis board from leaking through the gap between the hole of the chassis board and the upward protruding portion of the elastic pad.

10. A pointing device of a keyboard which comprises a chassis board for mounting a plurality of keys, the chassis board comprising a hole positioned at its approximate center for mounting the pointing device, the pointing device comprising:

a pedestal installed below the chassis board under the hole of the chassis board;

an elastic pad mounted above the chassis board which comprises a circular structure with a hole in it; and a control bar vertically fixed to the pedestal and protruding through the holes of the elastic pad and the chassis board;

wherein the circular structure is tightly wrapped around the control bar to prevent liquid above the chassis board from leaking through the gap between the hole of the circular structure and the control bar.

11. The pointing device of claim 10 wherein the circular structure is an upward protruding and ring shaped rubber pad.

12. A pointing device of a keyboard which comprises a chassis board for mounting a plurality of keys, the chassis board comprising a hole for mounting the pointing device, the pointing device comprising:

a base plate installed below the chassis board under the hole of the chassis board;

a plastic pedestal coupled to a center portion of the base plate by using insert molding;

an elastic pad mounted between the chassis board and the base plate with a hole positioned below the hole of the chassis board; and a control bar vertically fixed to the plastic pedestal and protruding through the holes of the elastic pad and the chassis board;

wherein the elastic pad is tightly clamped so as to be flush against all surfaces between the plastic pedestal and the chassis board for preventing liquid above the chassis board from leaking into the space below the chassis board and the base plate through the hole of the chassis board.

13. The pointing device of claim 12 wherein the elastic pad is a rubber ring.

14. The pointing device of claim 13 wherein the elastic pad comprises an upward protruding portion and the hole of the elastic pad is positioned at a center of the upward protruding portion wherein the upward protruding portion is tightly wrapped around the control bar for prevent liquid above the chassis board from leaking through the hole of the elastic pad.

15. The pointing device of claim 14 further comprising a sensor installed at a lower end of the control bar and positioned within the upward protruding portion of the elastic pad for sensing movements of the control bar in various directions and generating corresponding sensing signals.

16. The pointing device of claim 12 wherein the base plate is fixed to the chassis board by using screws.

17. The pointing device of claim 12 wherein the elastic pad further comprises an upward protruding cap above the hole of the elastic pad for covering an upper end of the control bar to prevent liquid above the chassis board from leaking into the hole of the elastic pad.

* * * * *